(12) United States Patent
Matusz

(10) Patent No.: US 7,391,758 B2
(45) Date of Patent: Jun. 24, 2008

(54) UMTS RADIO LINK CONTROL WITH FULL CONCATENATION

(75) Inventor: Pawel O. Matusz, Pomorskie (PL)

(73) Assignee: Intel Corporation, Santa Clara, CA (US)

( * ) Notice: Subject to any disclaimer, the term of this patent is extended or adjusted under 35 U.S.C. 154(b) by 640 days.

(21) Appl. No.: 10/952,986

(22) Filed: Sep. 29, 2004

(65) Prior Publication Data

US 2006/0072494 A1    Apr. 6, 2006

(51) Int. Cl.
*H04J 3/24* (2006.01)
*H04J 1/16* (2006.01)
*H04J 3/00* (2006.01)
*H04B 7/212* (2006.01)
*H04Q 7/00* (2006.01)
*H04M 1/00* (2006.01)

(52) U.S. Cl. .................. 370/349; 370/345; 370/346; 370/347; 370/313; 370/314; 455/550.1; 455/556.2

(58) Field of Classification Search ......... 370/312–314, 370/310, 328–329, 338, 349–350, 367–374, 370/381, 385, 387–393, 465–467, 469–475, 370/901–902, 911–913, 473–475, 310.1, 370/345–347, 395.52; 455/41.2, 73, 403, 455/425, 412.2, 434, 466, 443–445, 447–449, 455/517, 524, 550.1, 556.2, 560, 450
See application file for complete search history.

(56) References Cited

U.S. PATENT DOCUMENTS

| 5,949,799 | A | 9/1999 | Grivna et al. | |
|---|---|---|---|---|
| 6,778,501 | B1 * | 8/2004 | Malmgren et al. | 370/236 |
| 6,978,413 | B2 * | 12/2005 | Han | 714/749 |
| 7,096,019 | B2 * | 8/2006 | Wang | 455/437 |
| 2002/0001314 | A1 * | 1/2002 | Yi et al. | 370/469 |
| 2003/0093739 | A1 | 5/2003 | Han | |
| 2004/0110469 | A1 * | 6/2004 | Judd et al. | 455/15 |
| 2004/0131185 | A1 * | 7/2004 | Kakumer | 380/247 |
| 2005/0138528 | A1 * | 6/2005 | Ameigeiras et al. | 714/774 |

FOREIGN PATENT DOCUMENTS

WO    WO 99/14963    * 3/1999

OTHER PUBLICATIONS

"Internet Services over HiperLAN/2", *ETSI: Chairman of ETSI Project Bran*, (Aug. 29, 2000), 1-14.
"Universal Mobile Telecommunications System (UMTS); RLC Protocol Specification", *3GPP TS 25.322 Version 4.0.0 Release 4*, (Mar. 2001), 1-57.

* cited by examiner

*Primary Examiner*—Meless N Zewdu
(74) *Attorney, Agent, or Firm*—The Law Offices of John C. Scott, LLC; John C. Scott

(57) ABSTRACT

Enhanced throughput is achieved by using full concatenation of SDUs, SDU fragments, and STATUS PDUs within the protocol data units of a UMTS-based system.

25 Claims, 6 Drawing Sheets

190

192
PLACE A STATUS PDU WITHIN A FIXED-LENGTH PDU TO BE TRANSMITTED FROM A COMMUNICATION DEVICE

194
CONCATENATE AT LEAST A FRAGMENT OF AN SDU AFTER THE STATUS PDU WITHIN THE FIXED-LENGTH PDU

Fig. 9

UMTS RADIO LINK CONTROL WITH FULL CONCATENATION

TECHNICAL FIELD

The invention relates generally to wireless communication and, more particularly, to techniques and structures for transferring data in a wireless telephony system.

BACKGROUND OF THE INVENTION

Universal Mobile Telecommunications Service (UMTS) is a third generation (3G) broadband cellular wireless standard. The Radio Link Control (RLC) sublayer of the UMTS standard includes an Acknowledged Mode (AM) of operation that supports an Automated Repeat Request (ARQ) function that provides for retransmissions of lost or erroneous data units. In its present form, the Acknowledged Mode of the RLC sublayer includes inefficiencies in the use of available bandwidth resources. There is a need for techniques and structures for enhancing the efficiency of the RLC sublayer of the UMTS standard and of similar communication protocols.

BRIEF DESCRIPTION OF THE DRAWINGS

FIG. 9 is a flowchart illustrating a method for use in enhancing throughput efficiency within a wireless communication system in accordance with an embodiment of the present invention.

DETAILED DESCRIPTION

Figure 1:
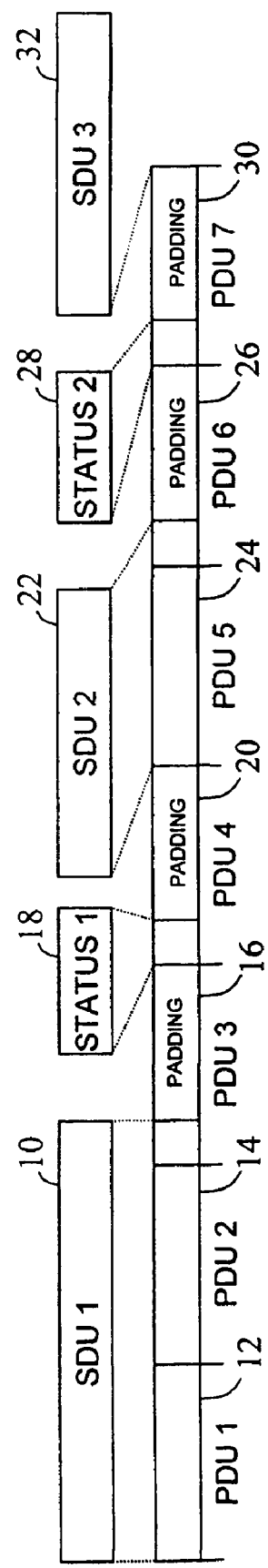
FIG. 1 is a signal diagram illustrating one technique for handling STATUS PDUs within a series of RLC AMD PDUs.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Universal Mobile Telecommunications Service (UMTS) is a third generation (3G) broadband cellular wireless standard. The UMTS standard includes a radio interface protocol stack that includes three layers. The second layer of the stack is divided into 4 main protocol sublayers; namely, Broadcast Multicast Control (BMC), Packet Data Compression Protocol (PDCP), Radio Link Control (RLC), and Medium Access Control (MAC). A primary function of the RLC sublayer is to segment RLC Service Data Units (SDUs) originating in the upper layers into fixed-length RLC Protocol Data Units (PDUs) for delivery to the medium access control (MAC) sublayer. The RLC sublayer also reassembles RLC PDUs from the MAC sublayer into RLC SDUs for delivery to the upper layers. The RLC sublayer includes three operational modes; namely, the Transparent Mode (TM), the Unacknowledged Mode (UM), and the Acknowledged Mode (AM). In TM, the RLC functions are limited to segmentation and reassembly. In UM, the functions of in-sequence delivery and missing RLC PDU detection are added to the base functions. AM, which is the most sophisticated mode, additionally implements an Automated Repeat Request (ARQ) mechanism to support retransmissions of lost or erroneous RLC PDUs.

In RLC AM, RLC PDUs are called RLC AMD PDUs (Acknowledge Mode Data PDUs). The RLC AM ARQ mechanism is a SR-ACK (Selective Repeat Acknowledge) mechanism, in which the receiver of AMD PDUs sends back special STATUS PDUs to the sender. These STATUS PDUs are either ACKs, which acknowledge a set of received AMD PDUs, or NACKs (Negative ACKs), which request retransmission of missing or erroneous AMD PDUs. STATUS PDUs are usually sent through the same data channel as the regular traffic (although provision is also made to send them through a separate channel).

Figure 2:
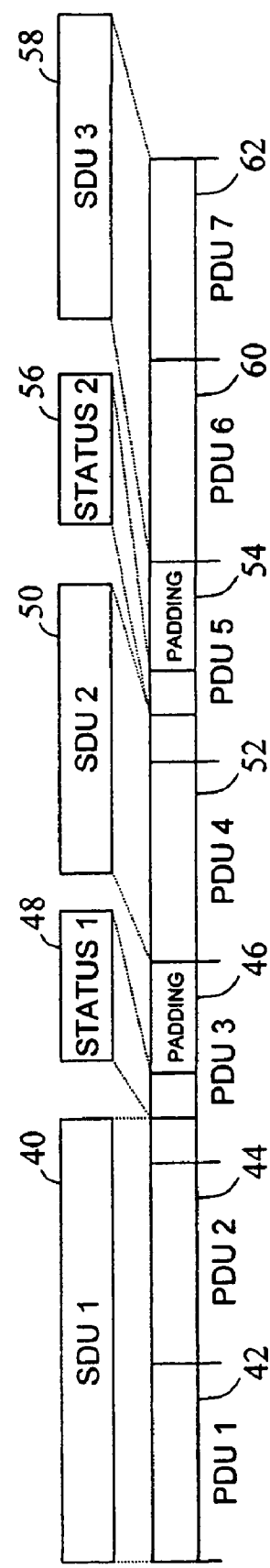
FIG. 2 is a signal diagram illustrating another technique for handling STATUS PDUs within a series of RLC AMD PDUs.

In the present RLC standard, RLC SDUs may be split among several PDUs and concatenated in these PDUs. STATUS PDUs, on the other hand, have to be either:

(a) sent as separate AMD PDUs, or (b) piggybacked in the padding portion of AMC PDUs (if there is enough padding). Because STATUS PDUs are typically very short (e.g., around 3 bytes in the case of ACKs), both of the above solutions may result in an inefficient use of bandwidth resources. FIGS. 1 and 2 are signal diagrams illustrating the operation of the above-referenced STATUS PDU scenarios for the same sequence of data elements to be transmitted. FIG. 1 illustrates a situation where STATUS PDUs are transmitted as separate AMD PDUs. As shown, a first SDU 10 is segmented between first, second, and third PDUs 12, 14, 16. The last fragment of the first SDU 10 occupies only a small portion of the third PDU 16. However, because the next item to be sent is a STATUS PDU 18, no concatenation is performed within the third PDU 16. Instead, the remainder of the third PDU 16 is padded and the STATUS PDU 18 is placed at the beginning of the fourth PDU 20. Placement of SDU fragments after the end of a STATUS PDU within a fixed-length PDU is not allowed. Therefore, the remainder of the fourth PDU 20 is also padded. STATUS PDUs are often on the order of 3 bytes (e.g., ACKs) while AMD PDUs are typically around 40 bytes. Thus, the fourth PDU 20 has 37 bytes of wasted space that could have been used to transmit usable data. A second SDU 22 is segmented between fifth and sixth PDUs 24,26 with the end of the sixth PDU 26 being padded. A second STATUS PDU 28 is placed at the beginning of a seventh PDU 30 with the reminder of the seventh PDU 30 being padded, and so on.

FIG. 2 illustrates a situation where STATUS PDUs are piggybacked into the padding portions of AMD PDUs. As shown, a first SDU 40 is segmented between first, second, and third PDUs 42, 44, 46. A first STATUS PDU 48 is then piggybacked after the last fragment of the first SDU 40 within the third PDU 46. As before, placement of SDU fragments after the end of a STATUS PDU within an AMD PDU is not permitted. Therefore, the remainder of the third PDU 46 is padded. A second SDU 50 is segmented between fourth and fifth PDUs 52, 54 and a second STATUS PDU 56 is piggybacked within the fifth PDU 54 after the last fragment of the second SDU 50. The remainder of the fifth PDU 54 is padded. A third SDU 58 is segmented between sixth and seventh PDUs 60, 62. The use of piggybacking to deliver STATUS PDUs, as illustrated in FIG. 2, is typically more efficient than the use of separate PDUs. However, under high traffic conditions, it has been found that very little padding is created within PDUs that can be used to carry STATUS PDUs. Therefore, the separate PDU scenario of FIG. 1 tends to predominate.

Figure 3:
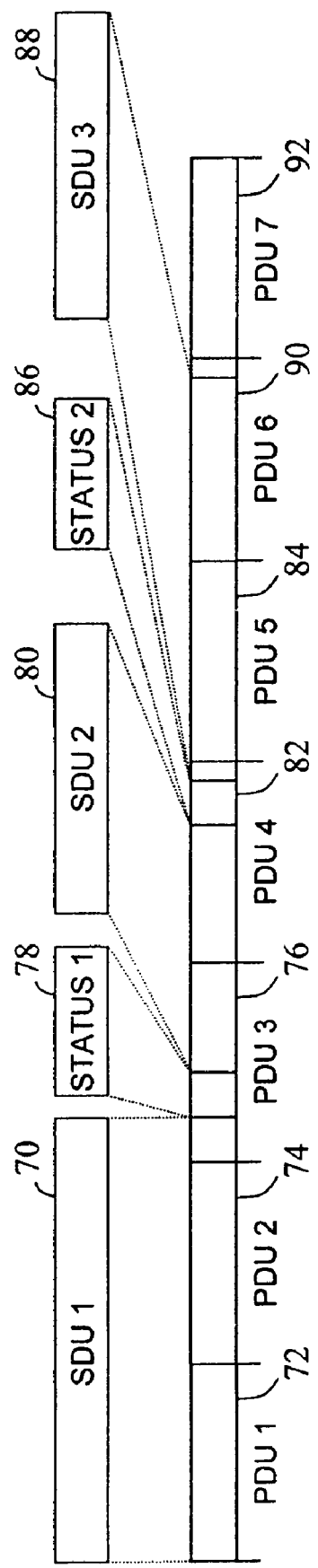
FIG. 3 is a signal diagram illustrating the use of a full concatenation scheme to handle STATUS PDUs within a series of RLC AMD PDUs in accordance with an embodiment of the present invention.

In at least one embodiment of the present invention, enhanced efficiency is achieved by implementing full concatenation of SDU fragments and STATUS PDUs within AMD PDUs. FIG. 3 is a signal diagram illustrating the use of a full concatenation scheme in accordance with an embodiment of the present invention. The signal diagram of FIG. 3 uses the same sequence of data elements as FIGS. 1 and 2. As shown, a first SDU 70 is segmented between first, second, and third PDUs 72, 74, 76 as before. A first STATUS PDU 78 is then concatenated after the last fragment of the first SDU 70 within the third PDU 76. A first fragment of a second SDU 80 is then concatenated after the first STATUS PDU 78 within the third PDU 76. A last fragment of the second SDU 80 is then placed at the beginning of the fourth PDU 82. A second STATUS PDU 86 is then concatenated after the last fragment of the second SDU 80 within the fourth PDU 82. A first fragment of a third SDU 88 is then concatenated after the second STATUS PDU 86 within the fourth PDU 82. The fifth PDU 84 includes a second fragment of the third SDU 88 and the sixth PDU 90 includes a third fragment of the third SDU 88. As shown in FIG. 3, the use of full concatenation may result in no padding being used during periods of high traffic volume (i.e., 100 percent of available throughput is utilized).

Figure 4:
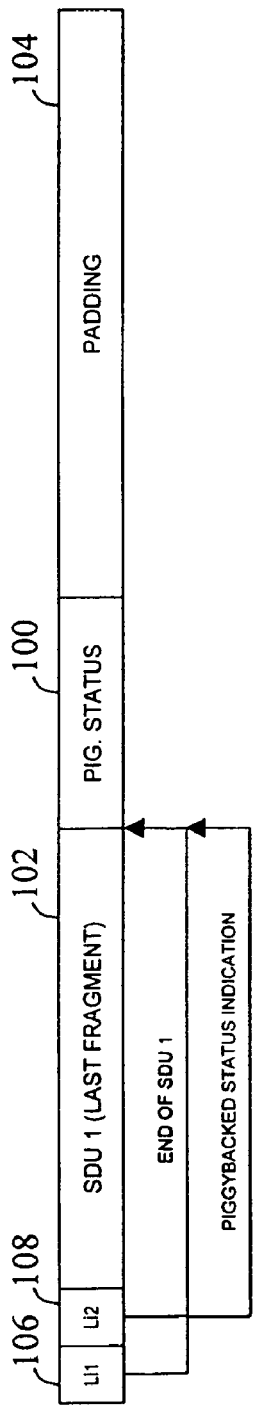
FIG. 4 is a signal diagram illustrating a technique for piggybacking a STATUS PDU onto an SDU fragment within an RLC AMD PDU.
Figure 5:
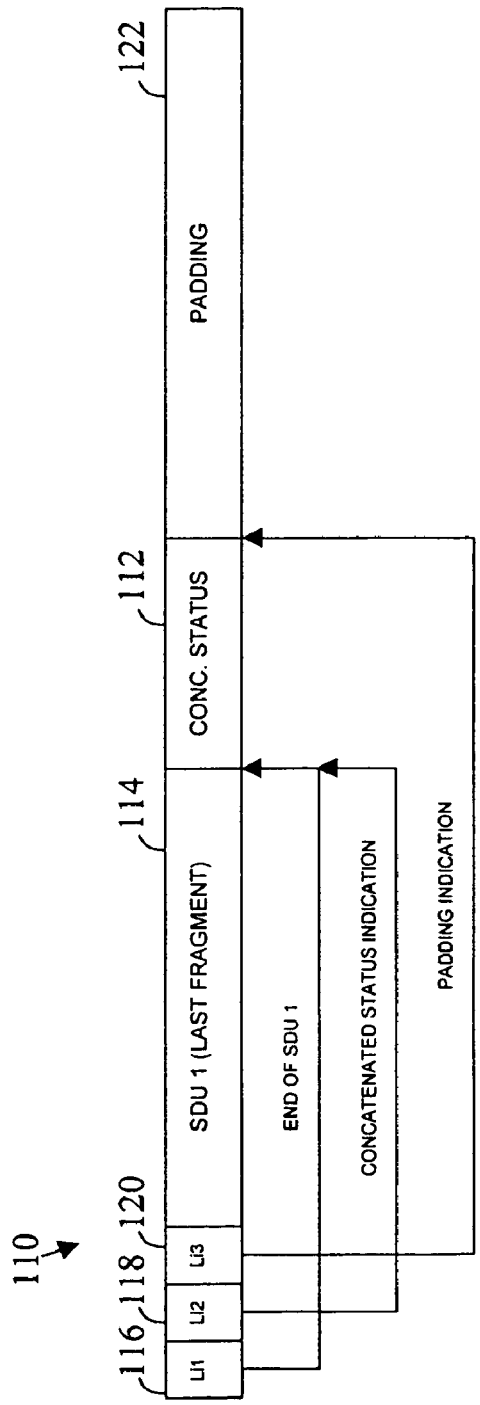
FIGS. 5-7 are signal diagrams illustrating techniques for achieving full concatenation of SDU fragments and STATUS PDUs in accordance with embodiments of the present invention.
Figure 6:
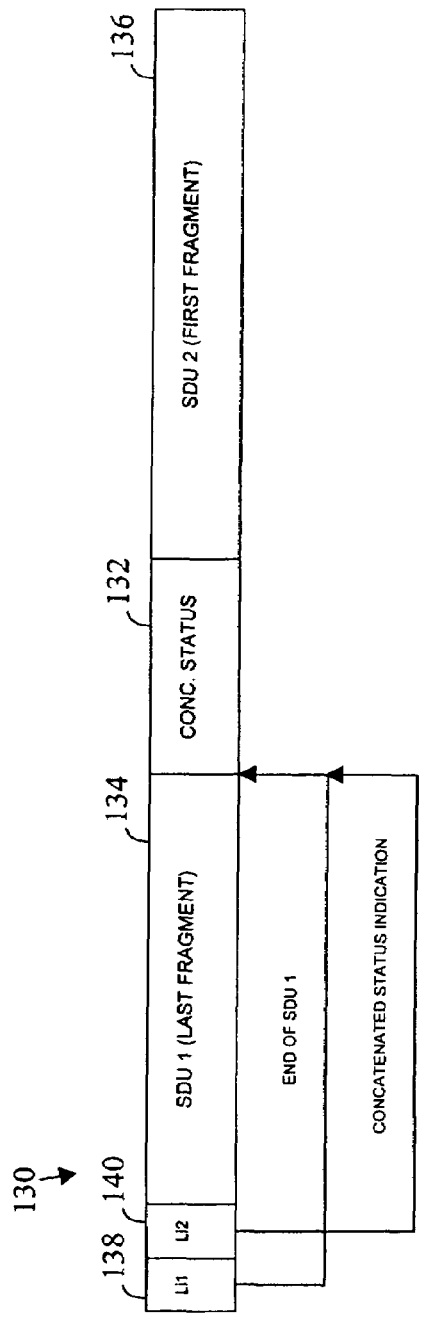
Figure 7:
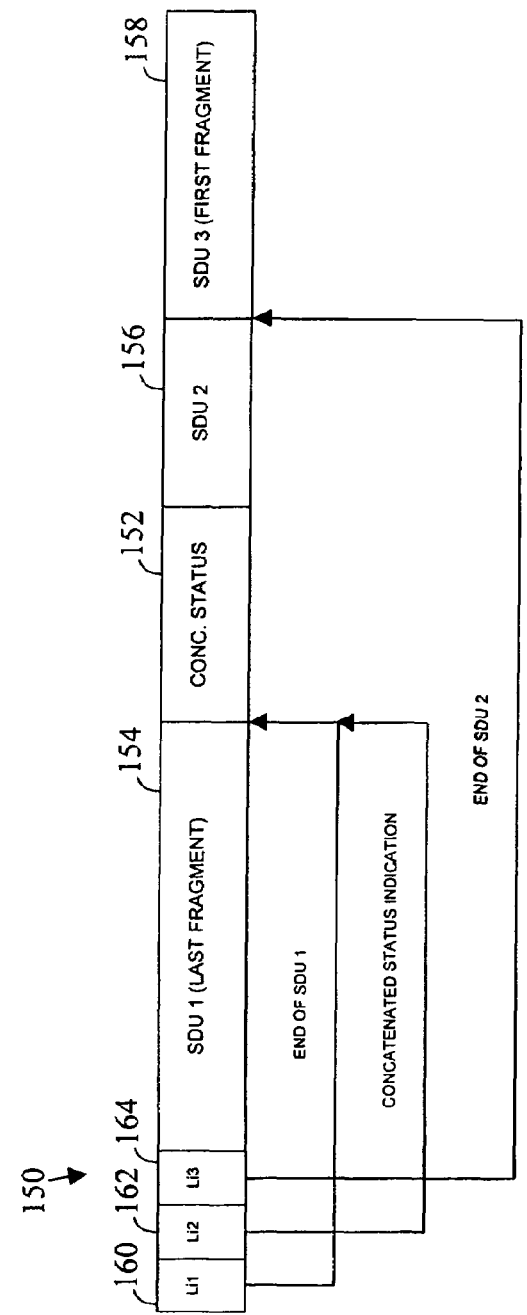

FIG. 4 is a signal diagram illustrating a technique for piggybacking a STATUS PDU onto an SDU fragment within an RLC AMD PDU. FIGS. 5-7 are signal diagrams illustrating techniques for achieving full concatenation of SDU fragments and STATUS PDUs in accordance with an embodiment of the present invention. Each of the diagrams illustrates a single RLC AMD PDU. In at least one embodiment of the invention, previously unused length indicator (LI) values reserved by the UMTS standard are used to enable the concatenation. In the standard, LIs may have one of two different lengths, depending on the length of the corresponding AMD PDU. For an AMD PDU that is 127 bytes in length or less, an LI is 7-bits long. For longer AMD PDUs, LIs are 15 bits long. FIG. 4 illustrates an AMD PDU 98 using the standard piggyback arrangement for a STATUS PDU 100 after the last fragment of an SDU 102 from the UMTS standard. As shown, the remaining portion 104 of the AMD PDU 98 is padded. Within the header of the RLC AMD PDU 98 are first and second length indicators 106, 108 (LI1, LI2). The first length indicator 106 includes information identifying the end of the SDU fragment 102. The second length indicator 108 includes an indication that a piggybacked STATUS PDU is present within the RLC AMD PDU 98.

FIG. 5 illustrates an example RLC AMD PDU 110 in which a STATUS PDU 112 is concatenated after the last fragment of an SDU 114 in accordance with an embodiment of the present invention. The remainder 122 of the RLC AMD PDU 110 after the concatenated STATUS PDU 112 is padded. Within the header of the RLC AMD PDU 110 are first, second, and third length indicators 116, 118, 120 (LI1, LI2, LI3). The first length indicator 116 includes information identifying the location of the end of the SDU fragment 114 (e.g., in one embodiment, it may equal the number of octets between the end of the header and up to and including the last octet of the SDU fragment 114). The second length indicator 118 includes an indication that a concatenated STATUS PDU is present within the RLC AMD PDU 110. A predefined data pattern may be selected to represent the concatenated STATUS PDU indicator. For example, for a 7-bit LI, the pattern may be 1111101. For a 15-bit LI, the pattern may be 111111111111101. Other patterns may alternatively be used. The concatenated STATUS PDU 112 includes information that can be used to determine where the STATUS PDU 112 ends (e.g., length information). The third (and last) length indicator 120 includes an indication that padding exists after the end of the concatenated STATUS PDU 112. A predefined data pattern is used to represent the padding indicator. A padding indicator indicates to a receiver that the AMD PDU no longer needs to be parsed.

FIG. 6 illustrates an example RLC AMD PDU 130 in which a STATUS PDU 132 is concatenated after the last fragment of a first SDU 134 in accordance with an embodiment of the present invention. In addition, a first fragment of a second SDU 136 is concatenated after the end of the STATUS PDU 132. Within the header of the RLC AMD PDU 130 are first and second length indicators 138, 140 (LI1, LI2). The first length indicator 138 includes information identifying the end of the first SDU fragment 134. The second length indicator 140 includes an indication that a concatenated STATUS PDU is present within the RLC AMD PDU 130. Again, a predefined data pattern may be selected to represent the concatenated STATUS PDU indicator. The concatenated STATUS PDU 132 includes information that can be used to determine where the STATUS PDU 132 ends. Because there is no padding indication, it is assumed during reception that an SDU fragment exists after the end of the concatenated STATUS PDU 132.

FIG. 7 illustrates an example RLC AMD PDU 150 in which a STATUS PDU 152 is concatenated after the last fragment of a first SDU 154 in accordance with an embodiment of the present invention. In addition, a full second SDU 156 is concatenated after the end of the STATUS PDU 152 and a first fragment of a third PDU 158 is concatenated after the end of the second PDU 156. Within the header of the RLC AMD PDU 150 are first, second, and third length indicators 160, 162, 164 (LI1, LI2, LI3). The first length indicator 160 includes information identifying the end of the first SDU fragment 154. The second length indicator 162 includes an indication that a concatenated STATUS PDU is present within the RLC AMD PDU 150. The concatenated STATUS PDU 152 may include information that can be used to determine where the STATUS PDU 152 ends. The third length indicator 164 includes information identifying the end of the second SDU 156. Because there is no padding indication, it is assumed during reception that an SDU fragment exists after the end of the second SDU 156. In at least one embodiment, multiple full SDUs may be concatenated after a STATUS PDU if space permits. In such an embodiment, length indicators may be provided within the header to identify the ends of each of the full SDUs.

In the RLC AMD PDU 150 of FIG. 7, the first fragment of the third SDU 158 may be replaced with padding. If this is the case, the third length indicator (LI3) 164 would still need to indicate the point where the second SDU 156 ends. In addition, a fourth length indicator (LI4) would be added to indicate the presence of the padding. In some AMD PDUs, a concatenated STATUS PDU may come first in the AMD PDU. If an AMD PDU includes a concatenated STATUS PDU with a PDU fragment thereafter, and the PDU fragment fills the entire remaining portion of the AMD PDU, then no LIs are needed in a header portion because the AMD PDU can be parsed without any additional information. If an AMD PDU includes a concatenated STATUS PDU with an SDU fragment thereafter and then padding, then a first LI in a header portion of the AMD PDU must indicate the end of the SDU fragment and a second LI must indicate the presence of the padding.

Figure 8:
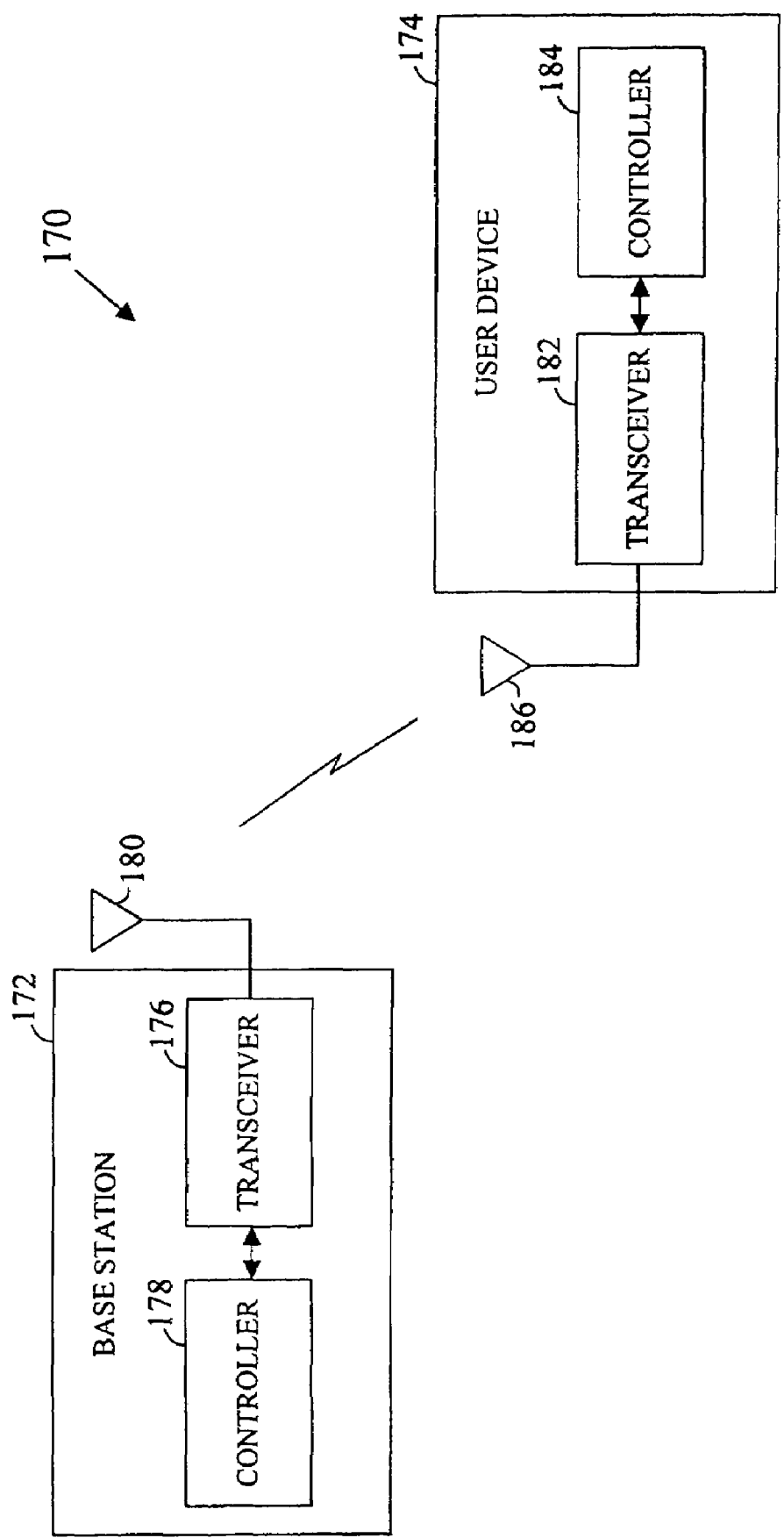
FIG. 8 is a block diagram illustrating an example communication system in accordance with an embodiment of the present invention.

FIG. 8 is a block diagram illustrating an example communication system 170 in accordance with an embodiment of the present invention. As shown, the system 170 includes a base station 172 and at least one user device 174. The user device 174 may include any type of wireless device including, for example, a cellular telephone or other handheld wireless communicator; a laptop, palmtop, desktop, or tablet computer having wireless capability; a personal digital assistant (PDA) having wireless capability; a pager; and/or others. The base station 172 may include a transceiver 176 and a controller 178. The transceiver 176 may be coupled to one or more antennas 180 to facilitate the transmission and reception of wireless signals. The user device 174 may include a transceiver 182 and a controller 184. The transceiver 182 may be coupled to one or more antennas 186 to facilitate the transmission and reception of wireless signals. Any type of antenna(s) may be used for the base station and the user device including, for example, dipoles, patches, helical antennas, antenna arrays, and/or others.

The transceiver 176 within the base station 172 and the transceiver 182 within the user device 174 are operative for supporting wireless communication between the two structures. If implemented within a UMTS-based system, the transceiver 176 within the base station 172 and the transceiver 182 within the user device 174 may each be designed to transmit at frequencies within a range between 1900 and 2200 megaHertz (MHz). The actual transmit frequencies may depend upon, for example, whether the transceiver is an uplink or a downlink transceiver, whether the transceiver is a satellite or terrestrial transceiver, and/or on other factors. The controller 178 within the base station 172 and the controller 184 within the user device 174 are operative for controlling the operation of the respective transceivers 176, 182, generating the transmit signals to be transmitted by the respective transceivers 176, 182, and processing the receive signals received by the respective transceivers 176, 182. The controllers 178, 184 may each be implemented using one or more digital processing devices (e.g., a general purpose microprocessor, a digital signal processor (DSP), a reduced instruction set computer (RISC), a complex instruction set computer (CISC), a field programmable gate array (FPGA), an application specific integrated circuit (ASIC), and/or others, including combinations of the above). In at least one embodiment of the present invention, the first and second controllers 178, 184 are programmed to concatenate SDU fragments and STATUS PDUs within AMD PDUs in a manner similar to that shown in FIG. 3. In at least one implementation, the specific techniques described in connection with FIGS. 5, 6, and 7 are followed. The controllers 178, 182 may also be programmed to receive and reassemble concatenated signals such as those illustrated in FIGS. 3, 5, 6, and 7.

FIG. 9 is a flowchart illustrating a method 190 for use in enhancing throughput efficiency within a wireless communication system in accordance with an embodiment of the present invention. The method 190 may be incorporated into the UMTS standard to enhance the efficiency of the RLC sublayer of the standard. The method 190 may also be utilized within other wireless systems that use fixed-length data units to transport data and that support data unit retransmission when one or more data units are not properly received. First, a STATUS PDU is placed within a fixed-length PDU for transmission to a remote entity (block 192). As shown in FIGS. 6 and 7, the STATUS PDU may be concatenated after the last fragment of a previous service data unit (SDU). In another scenario, the STATUS PDU may be placed at the beginning of the fixed-length PDU, just after the header. At least a fragment of an SDU is then concatenated after the STATUS PDU within the fixed-length PDU (block 194). For example, FIG. 6 illustrates a scenario where a fragment of an SDU 136 is concatenated after a STATUS PDU 132. Similarly, FIG. 7 illustrates a scenario where a full SDU 156 is concatenated after a STATUS PDU 152. A fragment of another SDU 158 may then be concatenated after the full SDU 156.

The techniques and structures of the present invention may be implemented in any of a variety of different forms. For example, features of the invention may be embodied within cellular telephones and other handheld wireless communicators; personal digital assistants having wireless capability; laptop, palmtop, desktop, and tablet computers having wireless capability; pagers; satellite communicators; cameras having wireless capability; audio/video devices having wireless capability; network interface cards (NICs) and other network interface structures; integrated circuits; as instructions and/or data structures stored on machine readable media; and/or in other formats. Examples of different types of machine readable media that may be used include floppy diskettes, hard disks, optical disks, compact disc read only memories (CD-ROMs), magneto-optical disks, read only memories (ROMs), random access memories (RAMs), erasable programmable ROMs (EPROMs), electrically erasable programmable ROMs (EEPROMs), magnetic or optical cards, flash memory, and/or other types of media suitable for storing electronic instructions or data. In at least one form, the invention is embodied as a set of instructions that are modulated onto a carrier wave for transmission over a transmission medium.

In the foregoing detailed description, various features of the invention are grouped together in one or more individual embodiments for the purpose of streamlining the disclosure. This method of disclosure is not to be interpreted as reflecting an intention that the claimed invention requires more features than are expressly recited in each claim. Rather, as the following claims reflect, inventive aspects may lie in less than all features of each disclosed embodiment.

Although the present invention has been described in conjunction with certain embodiments, it is to be understood that modifications and variations may be resorted to without departing from the spirit and scope of the invention as those skilled in the art readily understand. Such modifications and variations are considered to be within the purview and scope of the invention and the appended claims.

What is claimed is:

1. An apparatus comprising:
a wireless transceiver; and
a controller to generate transmit signals to be transmitted by said wireless transceiver, said controller to generate a transmit signal as a series of fixed-length protocol data units, said controller to segment service data units for delivery within said fixed-length protocol data units and to also deliver status protocol data units within said fixed-length protocol data units, said controller to concatenate at least a fragment of a service data unit after a status protocol data unit within a common fixed-length protocol data unit.

2. The apparatus of claim 1, wherein:
said status protocol data unit includes information indicative of whether a remote wireless entity needs to perform a retransmission.

3. The apparatus of claim 1, wherein:
said at least a fragment of a service data unit concatenated after said status protocol data unit within said common fixed-length protocol data unit includes a full service data unit; and
said controller to include a length indicator within a header portion of said common fixed-length protocol data unit that indicates the location of the end of said full service data unit within said common fixed-length protocol data unit.

4. The apparatus of claim 3, wherein:
said controller concatenates at least a fragment of a third service data unit after an end of said full service data unit within said common fixed-length protocol data unit.

5. The apparatus of claim 1, wherein:
said service data unit is a second service data unit; and
said controller concatenates said status protocol data unit after a last fragment of a first service data unit within said common fixed-length protocol data unit and said controller concatenates a first fragment of said second service data unit after said status protocol data unit within said common fixed-length protocol data unit.

6. The apparatus of claim 1, wherein:
said controller is to (a) place a last fragment of another service data unit at the beginning of another fixed-length protocol data unit, just after a header thereof, (b) concatenate another status protocol data unit after said last fragment of said another service data unit within said another fixed-length protocol data unit, (c) pad a portion of said another fixed-length protocol data unit after said another status protocol data unit; and (d) place a length indictor within said header of said another fixed-length protocol data unit indicating that there is padding after said another status protocol data unit.

7. A method comprising:
placing a status protocol data unit within a fixed-length protocol data unit to be transmitted from a communication device; and
concatenating at least a fragment of a service data unit after said status protocol data unit within said fixed-length protocol data unit.

8. The method of claim 7, wherein:
the placing of the status protocol data unit includes placing said status protocol data unit just after a header of said a fixed-length protocol data unit.

9. The method of claim 7, wherein:
said service data unit is a second service data unit; and
the placing of the status protocol data unit includes concatenating said status protocol data unit after a last fragment of a first service data unit within said a fixed-length protocol data unit.

10. The method of claim 9, wherein:
concatenating the at least a fragment of the service data unit includes concatenating a first fragment of said second service data unit after said status protocol data unit within said fixed-length protocol data unit.

11. The method of claim 9, wherein:
concatenating the at least said fragment of the service data unit includes concatenating a full service data unit after said status protocol data unit within said fixed-length protocol data unit, wherein a header portion of said fixed-length protocol data unit includes a length indicator identifying the location of an end of said full service data unit within said fixed-length protocol data unit.

12. The method of claim 11, further comprising:
concatenating at least a fragment of a third service data unit after an end of said full service data unit within said fixed-length protocol data unit.

13. The method of claim 7, further comprising:
placing a last fragment of another service data unit at the beginning of another fixed-length protocol data unit just after a header thereof
concatenating another status protocol data unit after said last fragment of said another service data unit within said another fixed-length protocol data unit;
padding a portion of said another fixed-length protocol data unit after said another status protocol data unit; and
placing a length indictor within said header of said another fixed-length protocol data unit indicating that there is padding after said another status protocol data unit.

14. A system comprising:
at least one dipole antenna;
a wireless transceiver coupled to said at least one dipole antenna; and
a controller to generate transmit signals to be transmitted by said wireless transceiver, said controller being programmed to generate a transmit signal as a series of fixed-length protocol data units, said controller having a function to segment service data units for delivery within said fixed-length protocol data units and to also deliver status protocol data units within said fixed-length protocol data units, said controller being programmed to concatenate at least a fragment of a service data unit after a status protocol data unit within a common fixed-length protocol data unit.

15. The system of claim 14, wherein:
said service data unit is a second service data unit; and
said controller concatenates said status protocol data unit after a last fragment of a first service data unit within said common fixed-length protocol data unit and said controller concatenates a first fragment of said second service data unit after said status protocol data unit within said common fixed-length protocol data unit.

16. The system of claim 14, wherein:
said at least a fragment of the service data unit concatenated after said status protocol data unit within said common fixed-length protocol data unit includes a full service data unit; and said controller is to include a length indicator within a header portion of said common fixed-length protocol data unit that indicates a location of an end of said full service data unit within said common fixed-length protocol data unit.

17. The system of claim 16, wherein:
said controller to concatenate at least a fragment of a third service data unit after an end of said full service data unit within said common fixed-length protocol data unit.

18. The system of claim 14, wherein:
said controller is to (a) place a last fragment of another service data unit at the beginning of another fixed-length protocol data unit, just after a header thereof, (b) concatenate another status protocol data unit after said last fragment of said another service data unit within said another fixed-length protocol data unit, (c) pad a portion of said another fixed-length protocol data unit after said another status protocol data unit; and (d) place a length indictor within said header of said another fixed-length protocol data unit indicating that there is padding after said another status protocol data unit.

19. An article comprising a computer readable storage medium having instructions stored thereon that, when executed by a computing platform, operates to:
place a status protocol data unit within a fixed-length protocol data unit to be transmitted from a communication device; and
concatenate at least a fragment of a service data unit after said status protocol data unit within said fixed-length protocol data unit.

20. The computer readable storage medium of claim 19, wherein: said operation to place the status protocol data unit includes an operation, to place said status protocol data unit just after a header of said a fixed-length protocol data unit.

21. The computer readable storage medium of claim 19, wherein: said service data unit is a second service data unit; and said operation to place the status protocol data unit includes an operation to concatenate said status protocol data unit after a last fragment of a first service data unit within said a fixed-length protocol data unit.

22. The computer readable storage medium of claim 19, wherein:
said service data unit is a second service data unit;
the operation to place a status protocol data unit within a fixed-length protocol data unit includes operation to concatenate said status protocol data unit after a last fragment of a first service data unit within said fixed-length protocol data unit; and
an operation to concatenate said at least a fragment of the service data unit after said status protocol data unit includes operation to concatenate a first fragment of said second service data unit after said status protocol data unit within said fixed-length protocol data unit, wherein a header portion of said fixed-length protocol data unit does not include a length indicator identifying a location of a beginning of said first fragment of said second service data unit within said fixed-length protocol data unit.

23. The computer readable storage medium of claim 19, wherein:
operation to concatenate said at least a fragment of the service data unit includes operation to concatenate a full service data unit after said status protocol data unit within said fixed-length protocol data unit, wherein a header portion of said fixed-length protocol data unit includes a length indicator identifying a location of an end of said full service data unit within said fixed-length protocol data unit.

24. The computer readable storage medium of claim 23, wherein said instructions further operate to: concatenate at least a fragment of a third service data unit after an end of said full service data unit within said fixed-length protocol data unit.

25. The computer readable storage medium of claim 19, wherein said instructions further operate to:
place a last fragment of another service data unit at the beginning of another fixed-length protocol data unit, just after a header;
concatenate another status protocol data unit after said last fragment of said another service data unit within said another fixed-length protocol data unit;
pad a portion of said another fixed-length protocol data unit after said another status protocol data unit; and
place a length indictor within said header of said another fixed-length protocol data unit indicating that there is padding after said another status protocol data unit.

\* \* \* \* \*

UNITED STATES PATENT AND TRADEMARK OFFICE
CERTIFICATE OF CORRECTION

PATENT NO. : 7,391,758 B2  Page 1 of 1
APPLICATION NO. : 10/952986
DATED : June 24, 2008
INVENTOR(S) : Matusz It is certified that error appears in the above-identified patent and that said Letters Patent is hereby corrected as shown below:

In column 7, line 57, in Claim 6, delete "indictor" and insert -- indicator --, therefor.

In column 8, line 37, in Claim 13, delete "indictor" and insert -- indicator --, therefor.

In column 9, line 19, in Claim 18, delete "indictor" and insert -- indicator --, therefor.

In column 9, line 33, in Claim 20, delete "operation," and insert -- operation --, therefor.

In column 10, line 39, in Claim 25, delete "indictor" and insert -- indicator --, therefor.

Signed and Sealed this

Ninth Day of September, 2008

JON W. DUDAS
*Director of the United States Patent and Trademark Office*

UNITED STATES PATENT AND TRADEMARK OFFICE
CERTIFICATE OF CORRECTION

PATENT NO. : 7,391,758 B2 Page 1 of 1
APPLICATION NO. : 10/952986
DATED : June 24, 2008
INVENTOR(S) : Matusz It is certified that error appears in the above-identified patent and that said Letters Patent is hereby corrected as shown below:

In column 7, line 57, in Claim 6, delete "indictor" and insert -- indicator --, therefor.

In column 8, line 37, in Claim 13, delete "indictor" and insert -- indicator --, therefor.

In column 9, line 19, in Claim 18, delete "indictor" and insert -- indicator --, therefor.

In column 9, line 33, in Claim 20, delete "operation," and insert -- operation --, therefor.

In column 10, line 39, in Claim 25, delete "indictor" and insert -- indicator --, therefor.

Signed and Sealed this

Sixteenth Day of September, 2008

JON W. DUDAS
*Director of the United States Patent and Trademark Office*